May 20, 1924.

S. HESELSCHWERDT

GATE

Filed Nov. 16, 1922

1,494,911

INVENTOR.
Samuel Heselschwerdt,

BY

Geo. P. Kimmel ATTORNEY.

Patented May 20, 1924.

1,494,911

UNITED STATES PATENT OFFICE.

SAMUEL HESELSCHWERDT, OF GRASS LAKE, MICHIGAN.

GATE.

Application filed November 16, 1922. Serial No. 601,342.

*To all whom it may concern:*

Be it known that I, SAMUEL HESELSCHWERDT, a citizen of the United States, residing at Grass Lake, in the county of Washtenaw and State of Michigan, have invented certain new and useful Improvements in Gates, of which the following is a specification.

This invention relates to gates, of the swinging type, designed primarily for use in connection with farm fences, but it is to be understood that a gate in accordance with this invention can be employed for any purpose wherein it is found applicable, and the invention has for its object to provide in a manner as hereinafter referred to, a gate of such class, with a braced body portion to prevent sagging intermediate the ends thereof and to further provide a gate with an arrester to prevent passage of animals through the body portion of the gate, said arrester being in the form of a wire panel adjustably connected to the ends of the body portion and further retained in abutting relation therewith by the bracing means therefor.

A further object of the invention is to provide, in a manner as hereinafter set forth, a swinging gate including a body portion and a bracing means therefor, and further providing the hinge members for the gate secured to the body portion of the gate and also to the bracing element for the body portion.

Further objects of the invention are to provide a swinging gate which is simple in its construction, strong, durable, compact, efficient in its use, readily assembled and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1, is a front elevation of the gate,

Figure 2, a rear elevation,

Figure 1:
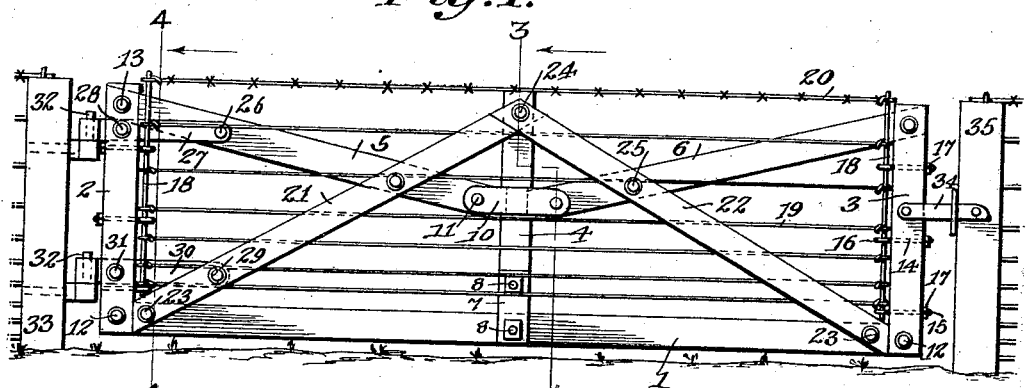
Figure 2:
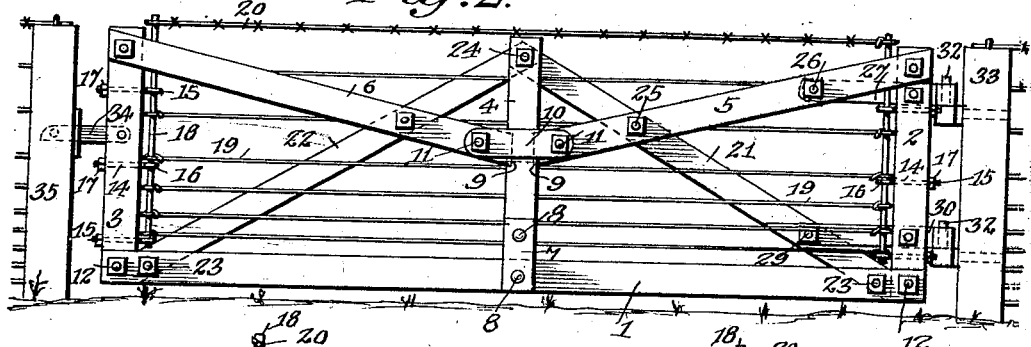
Figure 3:
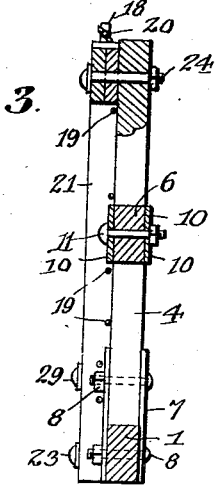
Figure 3, is a section on line 3—3, Figure 1.
Figure 4:
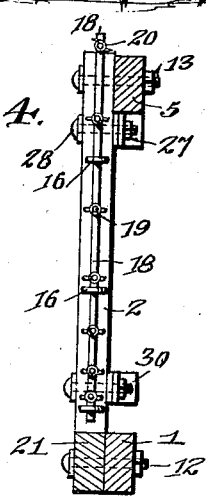
Figure 4, is a like view on line 4—4, Figure 1.

A swinging gate in accordance with this invention, comprises a body portion, bracing means therefor, and an arrester, as well as hinge elements carried by the body portion and a bracing means.

Referring to the drawings in detail, the body portion of the gate consists of a bottom bar 1, a pair of end bars 2, 3, and an intermediate bar 4. The bars 2, 3 and 4 are disposed vertically and extend at right angles with respect to the bar 1. The body portion further includes a pair of oppositely extending and upwardly inclined top bars 5, 6.

The intermediate bar is disposed centrally with respect to the bottom bar 1, and is positioned against the top edge of said bottom bar, as well as secured therewith, by a pair of coupling plates 7, which are arranged against the front and rear of the bar 4, and overlap the front and rear of the bar 1. The coupling plates are secured to the bars 1 and 4, by hold-fast devices 8, which are removable. The intermediate bar at a point removed from the upper end thereof and in each side is formed with a mortise 9, and into each mortise extends the inner end of a top bar. The top bars 5 and 6 are secured to the intermediate bar 4, by a pair of coupling plates 10, which are arranged at the front and rear of the said bars, and extend across the bar 4, and on to the bars 5, 6, and the said coupling plates 10 are secured in position by the removable hold-fast devices 11.

The end bars 2, 3, are positioned against one side of the bottom bar 1, at each end thereof and are secured to the said bottom bar 1 by removable hold-fast devices 12. The top bars 5, 6, which are disposed at an upward inclination with respect to the intermediate bar 4, are secured at their outer ends to the upper ends of the end bars 2, 3, by the removable hold fast devices 13. The top bars 5, 6, are positioned against that face of the end bars 2, 3, which is secured to the bottom bar 1.

Each of the end bars 2, 3, is formed with a series of openings 14, through each of which extends a threaded eye bolt 15, the eye of the latter is indicated at 16, and is positioned against the inner side edge of an end bar. The eye bolts 15, project outwardly from the outer side edges of the end bars 2, 3, and carry adjusting nuts 17, which have threaded engagement with the bolts 15. Arranged between the end bars 2, 3, as well as against the intermediate bar 4, is an arrester consisting of a wire panel formed of a pair of end rods 18, and a series of superposed lengths of wire 19, and an upper length of barbed wire 20. Each rod 18, is arranged in proximity to the inner edge of an end bar and extends through the eyes 16 of the bolts carried by each end bar. The rods 18, extend to the upper ends of the bars 2, 3, and at the upper ends of the rods 18, the length of wire 20 is connected and the other wires 19 are connected to the rods 18. The eye bolts 15, provide means for adjustably connecting the arrester to the end bars 2, 3, as well as means for detachably securing the same in position.

The bracing means for the body portion consists of a pair of oppositely extending and downwardly inclined brace members 21, 22, which are inclined in an opposite direction with respect to the top bars 5, 6. The brace members 22, at their lower ends are extended on the bottom bar 1, and abut against the end bars 2, 3, as well as being secured to the bottom bar 1, by the removable hold-fast devices 23. The upper ends of the brace members 21, 22, are mortised and are positioned in overlapping arrangement and further are connected to the upper end of the intermediate bar 4, by the removable hold-fast device 24. The brace members 21, 22, are also secured to the top bars 5, 6, by the removable hold-fast devices 25. The bracing means not only cooperate with the body portion of the gate for bracing it, but also acts as a means for retaining the arrester against the body portion as the arrester is interposed between the bracing means and the body portion.

Extended from the top bar 5, as well as being secured therewith by the removable hold-fast devices 26, is a hinge member 27, which is arranged against and extends from the end bar 2, as well as being secured to said end bar 2, by a removable hold-fast device 28. The hinge member 27, is arranged near the upper end of the end bar 2. Extended from the brace member 21, as well as being secured therewith by the removable hold-fast device 29, is a hinge member 30, which is arranged against as well as being secured to the end bar 2, by the removable hold-fast device 31. The hinge member 30, projects outwardly from the end bar 2, and is arranged near the lower portion thereof.

The hinge members 27 and 30 are pivotally connected as at 32, to a gate post 33, and the end bar 3, carries a latch 34, adapted to engage with a keeper carried by a gate post 35.

From the foregoing description taken in connection with the accompanying drawings a form of swinging gate is set up which is unusually strong and which can be conveniently knocked down or disassembled when occasion so requires, as well as conveniently assembled and if any of the elements become damaged, it can be removed and a new one substituted without discarding the remaining elements, and although the preferred construction of gate is as illustrated, yet changes in the detail of construction can be had without departing from the spirit of the invention as claimed.

What I claim is:—

A hinged gate comprising a pair of end bars, a bottom bar connected to the end bars, an intermediate bar secured to the bottom bar, a pair of upwardly inclined oppositely disposed top bars extending from a point below the upper end of said intermediate bar to the top of said end bars, an arrester arranged above the bottom bar and positioned against the intermediate and top bars, means extending transversely through the end bars for connecting the ends of the arrester therewith, and a pair of oppositely disposed inclined brace members extending from the upper end of the intermediate bar to the bottom and end bars and arranged against said arrester, and means for securing the brace members to said top bars.

In testimony whereof, I affix my signature hereto.

SAMUEL HESELSCHWERDT.